US007536552B2

(12) United States Patent
Touitou et al.

(10) Patent No.: US 7,536,552 B2
(45) Date of Patent: May 19, 2009

(54) UPPER-LEVEL PROTOCOL AUTHENTICATION

(75) Inventors: Dan Touitou, Ramat Gan (IL); Rafi Zadikario, Kfar Saba (IL)

(73) Assignee: Cisco Technology, Inc., San Jose, CA (US)

( * ) Notice: Subject to any disclaimer, the term of this patent is extended or adjusted under 35 U.S.C. 154(b) by 839 days.

(21) Appl. No.: 11/042,787

(22) Filed: Jan. 24, 2005

(65) Prior Publication Data
US 2005/0166049 A1 Jul. 28, 2005

Related U.S. Application Data

(60) Provisional application No. 60/539,327, filed on Jan. 26, 2004.

(51) Int. Cl.
*H04L 9/00* (2006.01)
(52) U.S. Cl. .................. 713/170; 713/168; 713/150
(58) Field of Classification Search ........... 713/170, 713/168, 150
See application file for complete search history.

(56) References Cited

U.S. PATENT DOCUMENTS

| 6,279,113 | B1 | 8/2001 | Vaidya |
| 6,397,335 | B1 | 5/2002 | Franczek et al. |
| 6,487,666 | B1 | 11/2002 | Shanklin et al. |
| 6,513,122 | B1 | 1/2003 | Magdych et al. |
| 6,907,525 | B2 | 6/2005 | Pazi et al. |
| 2004/0093513 | A1 | 5/2004 | Cantrell et al. |

FOREIGN PATENT DOCUMENTS

WO    WO 03/050644    6/2003

OTHER PUBLICATIONS

Hussain et al., A framework for classifying denial of service attacks, year 2003.*
The TrustedFlow/spl trade/ protocol—idiosyncratic signatures for authenticated execution Baldi, M.; Ofek, Y.; Yung, M.; Information Assurance Workshop, 2003. IEEE Systems, Man and Cybernetics Society Jun. 18-20, 2003 pp. 288-289.*
draft-ietf-idwg-beep-idxp-07—The Intrusion Detection Exchange Protocol, year 2002.*
Access control scheme for Web services ( ACSWS ) Elsheikh, S.; Computer and Communication Engineering, 2008. ICCCE 2008. International Conference on May 13-15, 2008 pp. 854-858.*
Advanced White List Approach for Preventing Access to Phishing Sites JungMin Kang; DoHoon Lee; Convergence Information Technology, 2007. International Conference on Nov. 21-23, 2007 pp. 491-496.*

(Continued)

*Primary Examiner*—David Y Jung
(74) *Attorney, Agent, or Firm*—Abelman, Frayne & Schwab

(57) ABSTRACT

A method for authenticating communication traffic includes receiving a first message, sent over a network from a source address, requesting information from a server in accordance with a higher-level protocol. A challenge is sent to the source address in reply to the first message, in accordance with the higher-level protocol. A second message is received from the source address following the challenge, and the legitimacy of the source address is assessed by determining whether the second message contains a correct response to the challenge.

11 Claims, 3 Drawing Sheets

OTHER PUBLICATIONS

Security-Enhanced Callback URL Service in Mobile Device Seung-Hyun Kim; Seunghun Jin; Advanced Communication Technology, The 9th International Conference on vol. 3, Feb. 12-14, 2007 pp. 1500-1504.*

U.S. Appl. No. 09/929,877, filed Aug. 2001.
U.S. Appl. No. 10/232,993, filed Aug. 2002.
U.S. Appl. No. 60/539,327, filed Jan. 2004.

* cited by examiner

UPPER-LEVEL PROTOCOL AUTHENTICATION

CROSS-REFERENCE TO RELATED APPLICATIONS

This application claims the benefit of U.S. Provisional Patent Application 60/539,327, filed Jan. 26, 2004, and is related to the following co-pending applications: U.S. patent application Ser. No. 09/929,877, filed Aug. 14, 2001; U.S. patent application Ser. No. 10/232,993, filed Aug. 29, 2002; U.S. patent application Ser. No. 10/251,912, filed Sep. 20, 2002; and PCT Patent Application PCT/IL02/00996, filed Dec. 10, 2002. All of these related applications are assigned to the assignee of the present patent application and are incorporated herein by reference.

FIELD OF THE INVENTION

The present invention relates generally to computer networks, and specifically to methods and systems for protecting against denial of service and worm attacks in computer networks.

BACKGROUND OF THE INVENTION

In a Denial-of-Service (DoS) attack, an attacker bombards a victim network or server with a large volume of message traffic. The traffic overload consumes the victim's available bandwidth, CPU capacity, or other critical system resources, and eventually brings the victim to a situation in which it is unable to serve its legitimate clients. Distributed DoS (DDoS) attacks can be even more damaging, as they involve creating artificial network traffic from multiple sources simultaneously.

In order to launch an, effective DDoS attack, an attacker typically attempts to control a large number of servers on the Internet. One approach to gaining such control is to use "worms," which are malicious programs that self-replicate across the Internet by exploiting security flaws in widely-used services. Worm infections are often invisible to the user of an infected computer, and the worm may copy itself to other computers independently of any action taken by the computer user. After taking control of a computer, the worm often uses the computer to participate in a DDoS attack, without any knowing collaboration on the part of the computer user. Infected computers that participate in this sort of mass malicious activity are referred to herein as "zombies."

The present invention will be more fully understood from the following detailed description of the embodiments thereof, taken together with the drawings in which:

DETAILED DESCRIPTION OF EMBODIMENTS

Many DDoS attacks use "spoofed" IP packets—packets containing a bogus IP source address—making it difficult for the victim network to identify the source of the attack. In response to this problem, the above-mentioned related applications describe methods that may be used to determine whether the IP source address of an incoming packet is authentic or spoofed. Traffic from authentic IP addresses may then be passed on to its intended destination, while packets with spoofed addresses are blocked.

Zombies, however, may have legitimate IP addresses (belonging to the infected source computer), and anti-spoofing measures may therefore fail to filter out the packets generated by such zombies during a DDoS attack. Thus, in a typical attack, many zombies may succeed in establishing TCP connections with a victim server, and then may use these connections to bombard the server with messages, such as HTTP requests.

Embodiments of the present invention provide methods for resisting this sort of attack, by distinguishing legitimate messages from messages sent by zombies. For this purpose, some embodiments of the present invention enable a network guard device to challenge sources of incoming packet traffic so as to determine whether the sources comply fully with higher-level communication protocols, such as HTTP (including features of HTML) or DNS, which operate above the transport layer (typically TCP or UDP). Failure of a computer at a given source IP address to comply with the higher-level protocol indicates that the source may be a zombie, and incoming packets from this source are therefore blocked.

Figure 1:
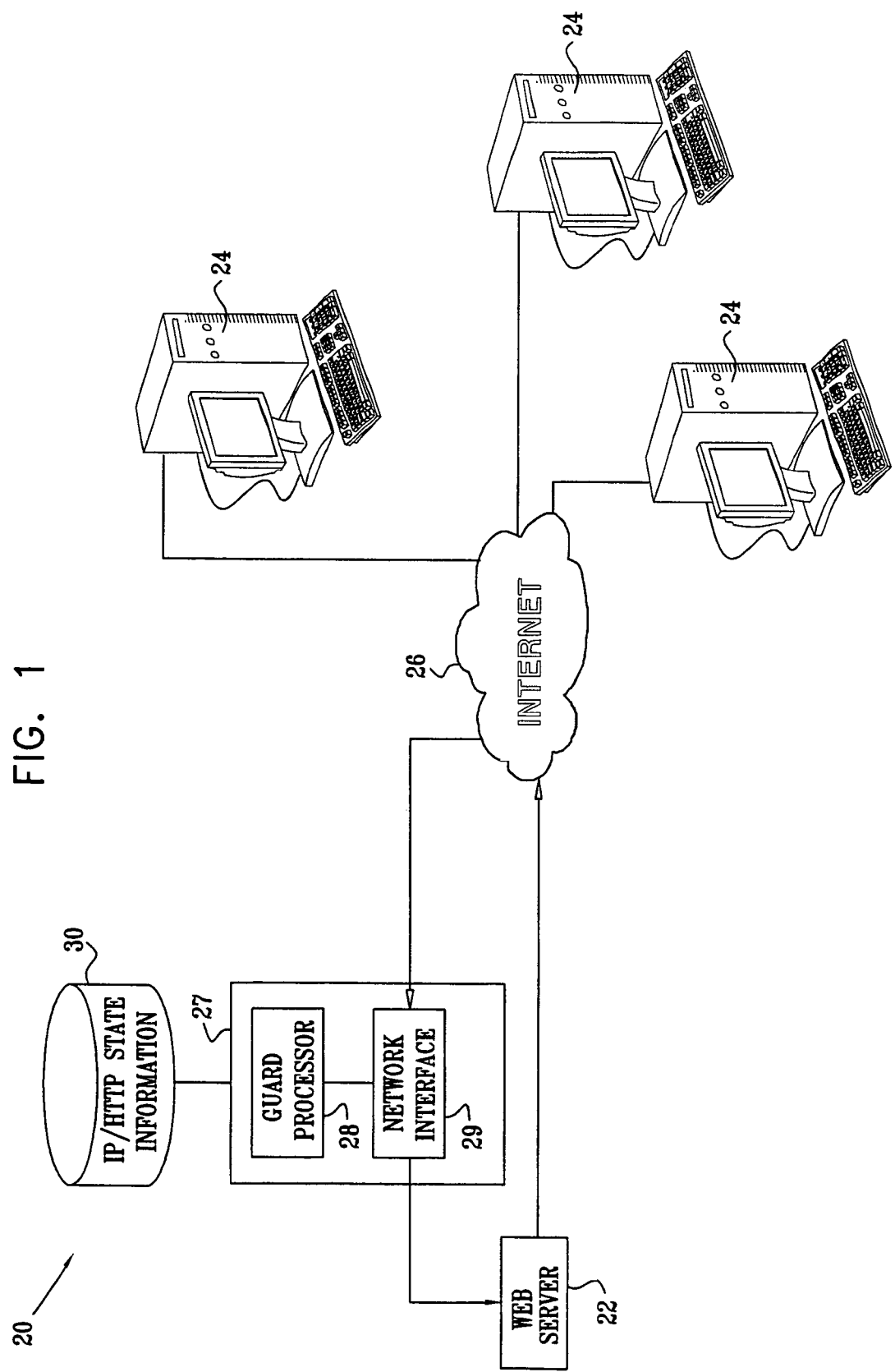
FIG. 1 is a block diagram that schematically illustrates a computer network system, in accordance with an embodiment of the present invention.

FIG. 1 is a block diagram that schematically illustrates a computer network system 20, in accordance with a preferred embodiment of the present invention. A Web server 22 communicates with clients 24 via a wide-area network (WAN) 26, typically the Internet. To prevent DDoS attacks on server 22, a guard device 27 intercepts incoming HTTP request packets from network 26 that are addressed to server 22. Guard device 27 comprises a guard processor 28, which performs the various protection and authentication methods described herein, and a network interface 29, which communicates with other components of system 20 and with WAN 26. The guard processor checks the IP source address of each packet that it intercepts against reference values stored in a, database 30 or other data structure. Methods for generating these reference values—indicating which requests are legitimate, and which may have originated from spoofed IP addresses or from zombies—are described further hereinbelow. The guard processor blocks illegitimate requests from passing through to server 22.

The configuration and operation of guard device 27 are shown and described herein by way of example, and alternative configurations and modes of operation will be apparent to those skilled in the art. For example, rather than being connected in-line with server 22, as shown in FIG. 1, guard device 27 may be connected in other configurations, for example, by a "lollipop" connection to a router (not shown) that forwards packets to server 22. Alternatively, functions of the guard device may be integrated into the router or server or into other network equipment, such as a firewall. These and other possible operational configurations of the guard device are described in the above-mentioned related applications. Note that although guard device 27 is shown and described herein as protecting a single server 22, in practice one or more guard devices of this sort may be deployed to protect a group of computers, such as a cluster of servers or an entire LAN. Additional deployment scenarios for the guard device(s) (not necessarily zombie-based) are described in the above-mentioned related applications.

Typically, guard device 27 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, guard device 27 may be implemented in dedicated hardware logic, or using a combination of hardware and software elements.

Figure 2:
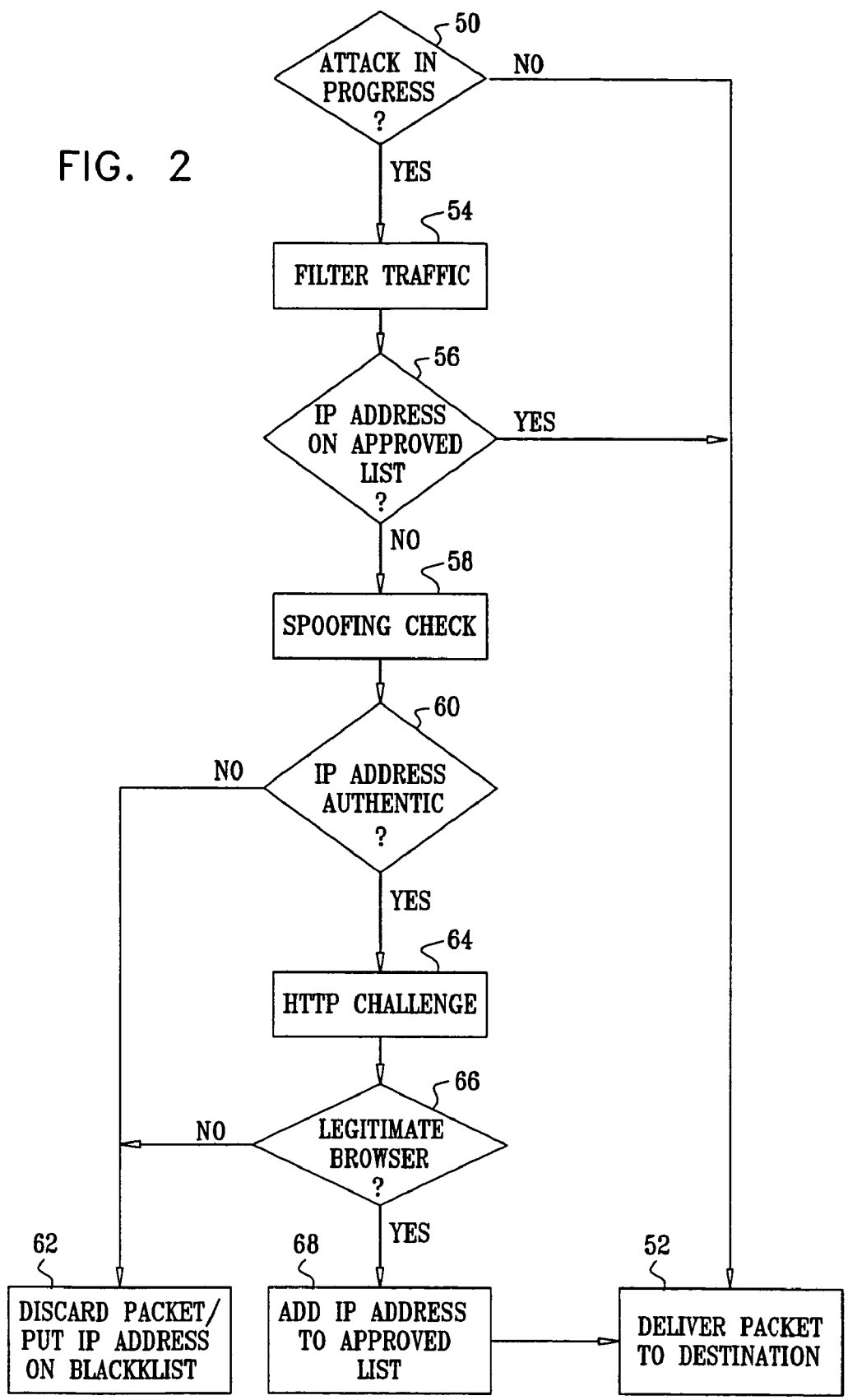
FIG. 2 is a flow chart that schematically illustrates a method for protecting against DDoS attacks, in accordance with an embodiment of the present invention.

FIG. 2 is a flow chart that schematically illustrates a method that is carried out by guard processor 28 for protection against DDoS attacks, in accordance with an embodiment of the present invention. The guard processor may perform its packet screening and verification functions at all times, or it may alternatively filter packets only under stress conditions, in which a DDoS attack on server 22 is suspected. In order to determine whether an attack may be in progress, guard processor 28 intercepts incoming traffic via network interface 29 and monitors selected statistical characteristics of the incoming traffic that is directed to server 22, at an attack detection step 50. For example, the guard processor may use one or more of the following criteria to detect a zombie-based DDoS attack:

Number and distribution of source IP addresses—A sudden change, such as an increase in the number of different source IP addresses attempting to communicate with the server, may be indicative of an attack.

Distribution of user agents specified in HTTP requests—The agent field in the HTTP request is optional, but it is usually used to specify the type of browser submitting the request. A sudden change in the distribution of agents may indicate that a large fraction of the requests are being submitted by zombies, which specify a particular agent as dictated by the malicious program that is controlling them. (In order to limit the amount of malicious traffic that can reach server 22, guard processor 28 may optionally determine, in the absence of an attack, a baseline percentage distribution of HTTP requests among the different possible user agents, and may then simply block all traffic specifying a particular user agent that is in excess of the baseline percentage for that agent.) Similarly a sudden change in the number of requests without the agent field, or with a bogus agent field, may be indicative of a zombie attack.

Occurrence of other regular patterns in the incoming traffic—Zombies tend to send many identical packets repeatedly, at regular intervals. Detection of this sort of repeating pattern may be indicative of an attack.

Other attack detection criteria will be apparent to those skilled in the art. Additional criteria (not necessarily zombie-based) are described in the above-mentioned related applications.

As long as no attack in progress, guard processor 28 typically permits incoming packets to pass through to server 22, at a packet delivery step 52. On the other hand, when an attack is believed to be in progress, guard processor 28 filters some or all of the incoming traffic, at a filtering step 54. For this purpose, the guard processor maintains a record in database 30 of IP source addresses that are known to be legitimate (because of past communications with these source addresses, as described below). Database 30 may also contain a "blacklist" of addresses that are believed to be malicious. Guard processor 28 checks the source address of each incoming packet against the database record, at a source address checking step 56. If the address appears on the legitimate list, the packet is passed on to server 22 at step 52. (Additionally or alternatively, if the address appears on the blacklist, the packet may be discarded.)

If the IP source address of the incoming packet is unknown, guard processor 28 tests the address to determine whether it is legitimate or spoofed, at a spoofing check step 58. Typically, the guard processor initiates a challenge/response routine, by sending a packet (the "challenge") containing certain information to the IP source address of the incoming packet via interface 29. The guard processor then checks that the response packet received from the IP source address contains appropriate matching information, at an IP authentication step 60. Various challenge/response methods that may be used for this purpose are described in the above-mentioned U.S. patent application Ser. No. 10/232,993. If the IP address is found to be bogus, the incoming packet is discarded, and the address may be entered in the blacklist in database 30, at a packet discard step 62.

Figure 3:
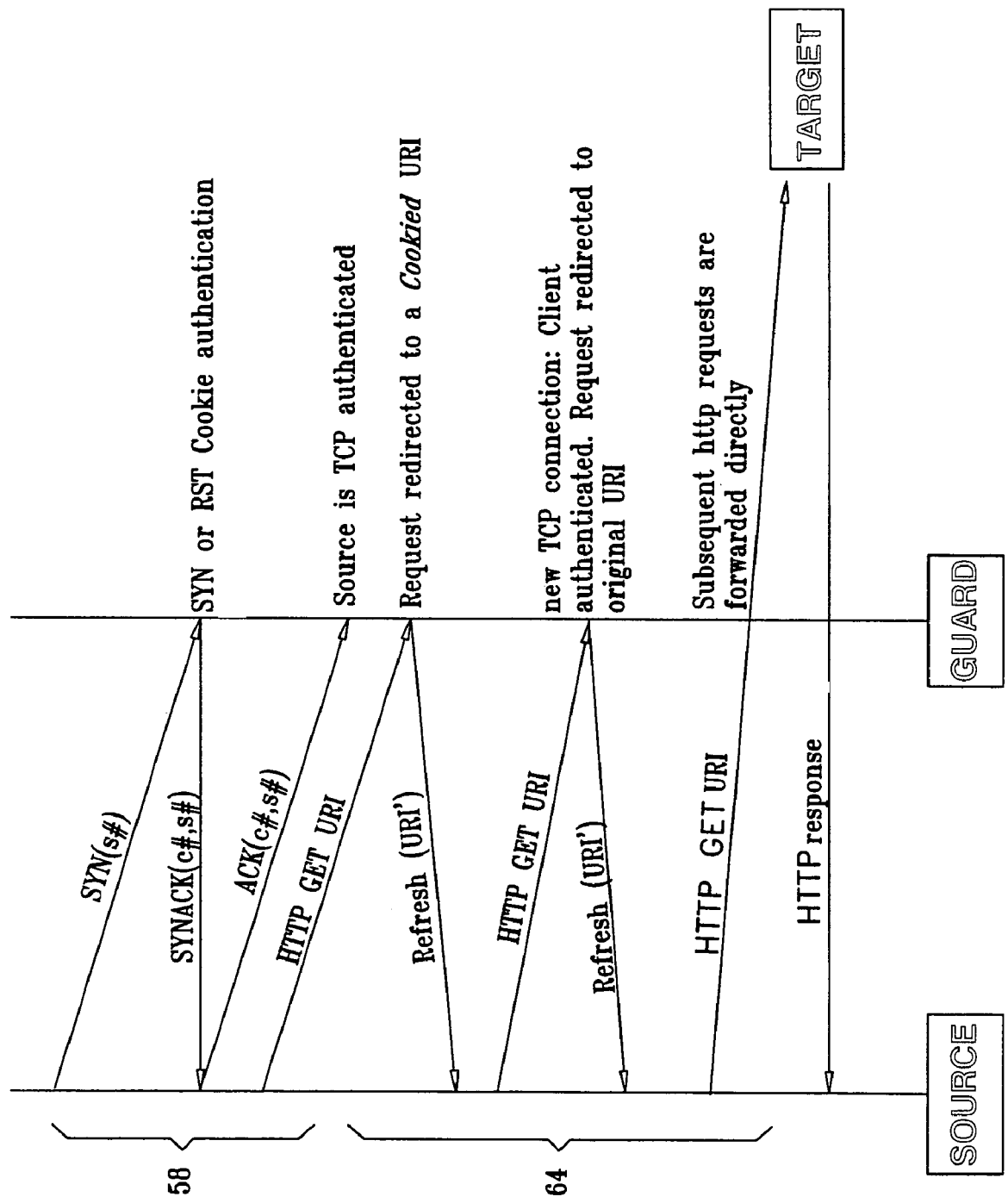
FIG. 3 is a message flow diagram that schematically shows details of a method for authenticating a source of incoming packet traffic, in accordance with an embodiment of the present invention.

FIG. 3 is a message flow diagram, which shows details of spoofing check step 58, in accordance with one embodiment of the present invention. In this example, the TCP three-way handshake is used to authenticate the source IP address. The message flow begins when guard processor 28 intercepts a TCP SYN packet sent from an IP source address that does not yet appear in database 30. The SYN packet has a certain packet sequence number (s#), in accordance with TCP convention. The guard processor sends back a TCP SYN-ACK packet to the IP source address of the SYN packet via interface 29. The SYN-ACK packet contains an encoded cookie (c#), which is encoded in the sequence number (s#) of the packet. Any suitable method of cookie generation that is known in the art may be used for this purpose and for generating cookies in other embodiments of the present invention. In one embodiment, a hash generator implements a hash function for mapping packet attributes, such as the IP source address and port, to cookies. The hash generator calculates a hash value, which is used as a key for indexing a cookie table comprising a set of random cookies. The random cookie values are replaced after use to prevent an attacker who succeeds in discovering a legitimate cookie value from re-using the cookie.

If guard processor 28 then receives a proper TCP ACK packet back from the same IP source address, identified by the proper sequence number and cookie, the guard processor is able to ascertain that the source address is legitimate, rather than spoofed. (Note, however, that the guard processor still does not know whether the computer at this source address is a zombie or not). Alternative anti-spoofing methods are described in the above-mentioned related applications.

Returning now to FIG. 2, after guard processor 28 verifies that the IP source address of a given packet is authentic at step 60, it may go on to test the legitimacy of the higher-level software running on the source computer, at a protocol challenge step 64. In the present embodiment, it is assumed that guard device 27 is protecting a Web server (as shown in FIG. 1), and that the guard processor has intercepted a HTTP request from an unknown source address. Step 64 tests whether the HTTP request was generated by a legitimate browser, complying with all the requirements of HTTP. Based on this test, the guard processor determines whether the source computer is legitimate or a zombie, at a browser legitimation step 66. An exemplary test of this sort is described below with reference to FIG. 3.

The test used at step 64 is based on sending a HTTP response, containing a HTML directive (the challenge), back to the IP source address of the incoming HTTP request, and checking the next reply returned from this IP address. For the most part, zombies are driven by relatively simple programs, which may be capable of emulating certain basic aspects of HTTP, but do not implement all the specified functions of HTML (as required, for example, by IETF RFC 1866 and the applicable HTML specification, such as HTML 4.0). Therefore, if the source address returns the reply that is expected in compliance with the protocol, guard processor 28 may conclude that the computer at the IP source address is legitimate, and is not a zombie. In this case, guard processor 28 adds the IP address to the list of legitimate addresses in database 30, at an address approval step 68. Packets from this address may now be delivered to server 22 at step 52. Otherwise, if the computer at the IP source address failed to respond to the challenge or responded incorrectly, the incoming packet is discarded at step 62, and its IP source address may be added to the blacklist.

FIG. 3 illustrates one type of test that may be used at step 64. In this example, it is assumed that after the source computer on network 26 establishes its TCP connection with guard device 27 (at step 58), it submits a HTTP request for a certain URI on server 22, for example, GET /index.html. As noted above, the request may also specify other HTTP fields, such as the user agent. The guard processor intercepts this request via interface 29 and returns a response, which redirects the source computer to refresh its browser with a new URI (identified in FIG. 3 as URI'). Requests directed to the URI' will also be intercepted by the guard processor, but URI' contains information, such as a cookie, that will enable the guard processor to identify the source of the request. For example, the guard processor may return a response containing the HTML directive: <META HTTP-EQUIV="Refresh CONTENT="1; URL=cookie.index.html">, wherein "cookie" is a unique string generated by the guard processor.

Normally, this response should cause the browser on the source computer to open a new TCP connection with guard processor 28, and then resubmit its HTTP request to URI', i.e., to "cookie.index.html". (To open a new TCP connection, the source computer again sends a SYN packet, receives a SYN-ACK from the guard or the target, and then sends an ACK. These three-way exchanges associated with the HTTP GET URI' and the final HTTP GET URI are omitted from FIG. 3 for the sake of simplicity.) Upon receiving this new request, the guard processor is able to conclude that it is communicating with a legitimate browser on the source computer, and adds the IP address of the source computer to its approved list in database 30. The guard processor then redirects the source computer once again to the original URI=index.html. As a result, the source computer will attempt to open yet another TCP connection with server 22. This time, however, the guard processor will recognize the IP source address of the TCP SYN packet from the source computer as legitimate, and will pass the packet through to server 22. The server and source computer may then proceed to communicate in the normal fashion.

On the other hand, if the original HTTP request from the source computer was sent by a zombie, rather than by a legitimate browser, the source computer will be unable to parse the HTTP response sent back by guard processor 28. Therefore, the source computer will not resubmit its request to "cookie.index.html". Rather, the source computer will, in all likelihood, simply continue submitting further requests to the original URI. Since the guard processor will not have authenticated the IP source address, it will not permit these requests to pass through to server 22. Furthermore, upon receiving multiple, repeated requests of this sort, the guard processor may conclude that the source of the requests is a zombie, and will then add the IP source address to the blacklist.

Various other methods may be used at step 64 in order to verify that a legitimate browser is operating at a given IP source address. These methods may be based on encoding cookies in other parts of the HTTP response sent by guard processor 28, or by testing the source computer for compliance with other aspects of the applicable protocols, such as RFC 1866 or RFC 2616. For example, the guard processor may redirect the browser on the source computer by replying to the initial HTTP request with a HTTP redirect response (status code 307), redirecting the client browser to URI', containing the encoded cookie.

Alternatively or additionally, the response sent by the guard processor may test whether the original HTTP request sent by the source computer was submitted in response to instructions of a human operator of the source computer. For example, the response may cause the browser on the source computer to display an image or play a sound, and prompt the human operator to type a corresponding word into the computer. The response causes the source computer to return the word that the user has typed, thus permitting the guard processor to verify the presence of a human user operating the browser on the source computer. A zombie, clearly, will fail this test. Challenge/response routines of this sort, for verifying the presence of a human user on the source computer, are described further in the above-mentioned U.S. patent application Ser. No. 09/929,877.

Although the embodiment described above makes reference particularly to HTTP and its use in conjunction with Web server 22, the principles of the present invention are generally applicable to authentication of incoming traffic using higher-level protocols of other types. In the context of the present patent application, the term "higher-level protocol" refers to protocols operating above the transport layer (layer 4), as defined by the well-known Open Systems Interconnection (OSI) Reference Model. Internet traffic generally uses TCP or UDP as its transport-layer protocol. Higher-level protocols that may operate over TCP or UDP include (but are not limited to) HTTP, FTP, DNS, RTP, POP/SMTP, SNMP, Usenet, Telnet and NFS. These protocols are generally classified as "presentation-layer" protocols, although this is a loose classification, and these protocols are also often referred to as "application-layer" protocols.

In any case, when clients attempt to communicate with a server according to any higher-level protocol such as these, a guard device protecting the server may use a challenge/response technique based on the requirements of the specific protocol in order to authenticate the sources of the communications. For example, the above-mentioned U.S. patent application Ser. No. 10/251,912 describes methods and devices for distinguishing between spoofed and authentic DNS requests. Many other higher-level protocols (in addition to those listed above) are known in the art, and are amenable to authentication by the methods of the present invention.

Furthermore, although the embodiments described above are directed mainly to processing IP packet traffic sent over the Internet, the principles of the present invention are similarly applicable to networks of other types, using other protocol families. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for processing communication traffic, comprising: monitoring the communication traffic that is sent over a network to a destination address; determining a baseline characteristic of the communication traffic while a DDoS attack is not in progress; detecting a deviation from the baseline characteristic that is indicative that at least some of the communication traffic has been sent by zombies having legitimate addresses on the network, wherein the deviation comprises at least one of a variation in a distribution of user agents specified in requests contained in the traffic, a variation in a distribution of source IP addresses, and a recurrence at regular intervals of a pattern of identical incoming data packets; and responsively to detecting the deviation, filtering the communication traffic so as to remove at least some of the communication traffic sent by the zombies, and to leave a first message in the communication traffic from a source computer sent from a source address that requests a first URI in accordance with a higher-level protocol; receiving the first message; sending a challenge to the source address of the first message in accordance with the higher-level protocol that directs the source computer to request a second URI in a second message; receiving the second message; verifying a presence of the second URI in the second message, responsively to verifying the presence of the second URI, accepting subsequent messages from the source address as legitimate.

2. The method according to claim 1, wherein detecting the deviation further comprises detecting an increase in a number of different source addresses from which the communication traffic has originated.

3. The method according to claim 1, wherein monitoring the communication traffic comprises reading contents of incoming data packets sent from the legitimate addresses on the network in accordance with a higher-level protocol, and wherein detecting the deviation comprises detecting a repeating pattern in the contents, wherein a plurality of the incoming data packets are identical and recur at regular intervals.

4. Apparatus for processing communication traffic, comprising: a network interface, which is arranged to communicate with a network; and a processor, which is coupled to the network interface and is arranged to monitor the communication traffic that is sent over the network to a destination address, to determine a baseline characteristic of the communication traffic while a DDoS attack is not in progress, to detect a deviation from the baseline characteristic that is indicative that at least some of the communication traffic has been sent by zombies having legitimate addresses on the network, and to filter the communication traffic responsively to detecting the deviation, so as to remove at least some of the communication traffic sent by the zombies, wherein the deviation comprises a variation in a distribution of user agents specified in HTTP requests, and to leave a first message in the communication traffic from a source computer sent from a source address that requests a first URI in accordance with a higher-level protocol, receive the first message, send a challenge to the source address of the first message in accordance with the higher-level protocol that directs the source computer to request a second URI in a second message, verify a presence of the second URI in the second message, and responsively to the presence of the second URI in the second message, to accept subsequent messages from the source address as legitimate.

5. The apparatus according to claim 4, wherein the processor is arranged to detect an increase in a number of different source addresses from which the communication traffic has originated.

6. The apparatus according to claim 4, wherein the processor is arranged to read contents of incoming data packets sent from the legitimate addresses on the network in accordance with a higher-level protocol and to detect a repeating pattern in the contents, wherein a plurality of the incoming data packets are identical and recur at regular intervals.

7. A computer software product for processing communication traffic, the product comprising a tangible computer-readable medium in which program instructions are stored, which instructions, when executed by one or more processors, cause the one or more processors to monitor the communication traffic that is sent over a network to a destination address, to determine a baseline characteristic of the communication traffic while a DDoS attack is not in progress, to detect a deviation from the baseline characteristic that is indicative that at least some of the communication traffic has been sent by zombies having legitimate addresses on the network, and to filter the communication traffic responsively to detecting the deviation, so as to remove at least some of the communication traffic sent by the zombies, wherein the deviation comprises a variation in a distribution of user agents specified in HTTP requests, and to leave a first message in the communication traffic from a source computer sent from a source address that requests a first URI in accordance with a higher-level protocol; receiving the first message, to send a challenge to the source address of the first message in accordance with the higher-level protocol that directs the source computer to request a second URI in a second message, to verify a presence of the second URI in the second message, and responsively to the presence of the second URI in the second message, to accept subsequent messages from the source address as legitimate.

8. The product according to claim 7, wherein the instructions cause the one or more processors to detect an increase in a number of different source addresses from which the communication traffic has originated.

9. The product according to claim 7, wherein the instructions cause the one or more processors to read contents of incoming data packets sent from the legitimate addresses on the network in accordance with a higher-level protocol and to detect a repeating pattern in the contents, wherein a plurality of the incoming data packets are identical and recur at regular intervals.

10. Apparatus for authenticating communication traffic, comprising: means for receiving a first message sent over a network from a source address, requesting information from a server in accordance with a higher-level protocol; means for sending a challenge to the source address in reply to the first message, in accordance with the higher-level protocol; means for receiving a second message from the source address following the challenge; and means for assessing legitimacy of the source address by determining whether the second message contains a correct response to the challenge, wherein the means for receiving a first message is operative to read contents of incoming data packets sent from legitimate addresses on the network in accordance with the higher-level protocol and to detect a repeating pattern in the contents, wherein a plurality of the incoming data packets are identical and recur at regular intervals, wherein responsively to a determination by the means for assessing legitimacy that assessment the second message contains the correct response to the challenge, the means for receiving a first message is operative to accept subsequent messages from the source address as legitimate.

11. The apparatus according to claim 10, further comprising: means for monitoring the communication traffic; means for determining a baseline characteristic of the communication traffic while a DDoS attack is not in progress; means for detecting a deviation from the baseline characteristic that is indicative that at least some of the communication traffic has been sent by zombies having legitimate addresses on the network; and means for filtering the communication traffic responsively to detecting the deviation, so as to remove at least some of the communication traffic sent by the zombies, wherein the deviation comprises a variation in a distribution of user agents specified in HTTP requests.

* * * * *